United States Patent (10) Patent No.: US 8,488,552 B2
Torsner et al. (45) Date of Patent: Jul. 16, 2013

(54) DOWNLINK SOLUTION FOR SEAMLESS AND LOSSLESS CELL CHANGE IN A CELLULAR SYSTEM

(75) Inventors: Per Johan Torsner, Masaby (FI); Göran Malmgren, Hägersten (SE); Shyam Chakraborty, Londondony (GB); Mats Sågfors, Kyrkslätt (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1022 days.

(21) Appl. No.: 12/090,633

(22) PCT Filed: Dec. 22, 2005

(86) PCT No.: PCT/EP2005/057089
§ 371 (c)(1),
(2), (4) Date: May 8, 2008

(87) PCT Pub. No.: WO2007/045280
PCT Pub. Date: Apr. 26, 2007

(65) Prior Publication Data
US 2008/0253334 A1 Oct. 16, 2008

(30) Foreign Application Priority Data
Oct. 17, 2005 (SE) .................................... 0502300-7

(51) Int. Cl.
*H04Q 7/38* (2006.01)
(52) U.S. Cl.
USPC ........................................................ 370/331
(58) Field of Classification Search
USPC ............................................................ 370/331
See application file for complete search history.

(56) References Cited

U.S. PATENT DOCUMENTS

| 5,896,373 | A | * | 4/1999 | Mitts et al. .................... 370/331 |
| 2003/0231598 | A1 | * | 12/2003 | Venkataraman et al. ..... 370/252 |
| 2005/0250500 | A1 | * | 11/2005 | Xu ................................. 455/442 |
| 2006/0094400 | A1 | * | 5/2006 | Beachem et al. ............. 455/410 |
| 2006/0148479 | A1 | * | 7/2006 | Park et al. ..................... 455/437 |
| 2007/0165572 | A1 | | 7/2007 | Lenzarini |
| 2008/0240035 | A1 | | 10/2008 | Backlund et al. |
| 2009/0028111 | A1 | | 1/2009 | Chao et al. |

FOREIGN PATENT DOCUMENTS

| EP | 1 432 262 A1 | 6/2004 |
| JP | 2003-153327 A | 5/2003 |
| WO | WO 98/47302 | 10/1998 |
| WO | WO 2005/067190 A1 | 7/2005 |

OTHER PUBLICATIONS

Universal Mobile Telecommunications System (UMTS); UTRA High Speed Downlink Packet Access (HSDPA); Overall description; Stage 2 (3GPP TS 25.308 version 5.7.0 Release 5).

* cited by examiner

*Primary Examiner* — Sulaiman Nooristany

(57) ABSTRACT

The present invention relates to a UE, base station network node and methods thereof in a cellular mobile communication system. One method concerns handover from a first radio base station to a second radio base station wherein, it comprises the steps receiving a notification from the first radio base station that currently serves said UE, said notification indicating the last packet to be transmitted to this user equipment from said first radio base station on a first connection; and informing the second radio base station by a request to commence transmission from this second radio base station when the notified last packet is received at the UE.

26 Claims, 3 Drawing Sheets

DOWNLINK SOLUTION FOR SEAMLESS AND LOSSLESS CELL CHANGE IN A CELLULAR SYSTEM

FIELD OF THE INVENTION

The present invention relates to methods and arrangements in cellular mobile communication systems, in particular to seamless and lossless cell changes in the downlink of such communication systems.

BACKGROUND OF THE INVENTION

The present invention relates to methods and arrangements in a user equipment (UE) and in a radio access network of a cellular mobile network. An example of such a radio access network is the UMTS terrestrial radio access network (UTRAN). The UTRAN is illustrated in FIG. 1 and comprises at least one Radio Network System 100 connected to the Core Network (CN) 200. The CN is connectable to other networks such as the Internet, other mobile networks e.g. GSM systems and fixed telephony networks. The RNS 100 comprises at least one Radio Network Controller 110. Furthermore, the respective RNC 110 controls a plurality of Node-Bs 120,130 also referred to as radio base stations. The Node Bs are connected to the RNC by means of the Iub interface 140. Each Node B covers one or more cells and is arranged to serve the User Equipment (UE) 300 within said cell. Finally, the UE 300, also referred to as mobile terminal, is connected to one or more Node Bs over the Wideband Code Division Multiple Access (WCDMA) based radio interface 150. The network of FIG. 1 is also referred to as a WCDMA network and is based on the WCDMA standard specified by the 3:rd Generation Partnership Project (3GPP).

For cellular networks that support full mobility, it is a particular challenge to support fast, seamless and lossless cell changes. This is true both for already deployed systems, e.g. GSM/GPRS, WCDMA, CDMA2000, and also for future systems, e.g. those as being referred to as 3GPP UTRAN Long Term Evolution (LTE) or 4G-systems. "Seamless" means here that the transmission is continuous, i.e. that there is no break in the transmission during the handover (cell change). "Lossless" means that no packets are lost during the handover. A further challenge is to avoid transmission of packet duplicates caused by the handover.

Requirements for mobile data access are increasing and demand for bandwidth is growing. To meet these needs the High Speed Data Packet Access (HSDPA) specification has been defined. HSDPA is based on WCDMA evolution standardized as part of 3GPP Release 5 WCDMA specifications. HSDPA is a packet-based data service in WCDMA downlink with data transmission peak rate up to 14.4 Mbps over a 5 MHz bandwidth. Thus HSDPA improves system capacity and increases user data rates in the downlink direction. The improved performance is based on adaptive modulation and coding, a fast scheduling function and fast retransmissions with soft combining and incremental redundancy. HSDPA utilizes a transport channel named the High Speed Downlink Shared Channel (HS-DSCH) that makes efficient use of valuable radio frequency resources and takes bursty packet data into account. This is a shared transport channel which means that resources, such as channelization codes, transmission power and infra structure hardware, is shared between several users.

With HS-DSCH, there is a new HARQ retransmission layer defined in the Node B. HARQ is a fast and resource-efficient method for combating transmission errors. However, this new HARQ layer means that buffering takes place in the radio base station, making thus seamless and lossless handovers a particular challenge. It is expected that the outcome from the 3GPP UTRAN LTE work will also include a realization with a fast HARQ and a scheduler residing in the radio base station.

In short, a typical HS-DSCH handover procedure is now explained. At times of handover, the controlling node, i.e. the RNC in a WCDMA system, assigns a certain time-offset (activation time), so that the involved radio base stations, i.e. the Node Bs in a WCDMA system, and the user equipments (UE) can prepare for the handover. These preparations include receiving necessary control information, but also the transmission of any remaining data in the buffer of the "old" radio base station, i.e. the radio base station that the UE is connected to before the handover. When the time-offset has elapsed, the handover is executed. After the handover, the scheduler in the "new" radio base station, i.e. the radio base station that the UE is connected to after the handover is performed, is responsible for assigning grants and scheduling packets. Any data remaining in the "old" radio base station is discarded and possibly recovered by some outer-layer ARQ, e.g. RLC terminated in the RNC. The HS-DSCH handover is further described in the specification TS 25.931 issued by the 3GPP.

A drawback with the above described handover procedure, is that it is very difficult to assign a suitable time-offset (activation time). A suitable time-offset is required in order to be able to successfully transmit all the packets that are forwarded via the "old" radio base station, e.g. a Node B1. Furthermore, it is also desired that the transmission is seamlessly continued from the "new" radio base station, e.g. Node B2.

Turning now to FIG. 2 illustrating the problem with handover activation time. FIG. 2 illustrates a UE that is connected to Node B1 and is about to perform a handover to Node B2. Each Node B comprises a buffer for buffering incoming packets from the controlling node RNC. Packets #1 to #5 have been forwarded to Node B1, which is currently responsible for transmitting to the UE. However, the RNC does not have precise information whether the packets have been delivered to the UE or not. In the present example it is assumed that packets #3, #4, and #5 still reside in the Node B1 buffer (or are delayed in the transport network) and queuing for transmission to the UE.

For the example shown in FIG. 2, when supposing that the RNC now executes a handover to Node B2 with a certain time-offset, packet #6 and onwards are then routed to Node B2 awaiting the handover to be properly executed. However, if the offset is too low, some (or parts of) packets #3, #4, and #5 may not get enough time for transmission, and will be discarded resulting in losses and if the offset is too high, packets #3, #4, and #5 may be transmitted well on time but there may then be a discontinuity in the transmission, as packet #6 cannot be transmitted before the execution of the handover.

SUMMARY OF THE INVENTION

As stated above, to estimate a suitable time-offset can be very difficult as the transmission time for the packets residing in the Node B1 buffer is strongly dependent on factors such as the link quality to this user and the load on the shared channel. Therefore with existing methods, it is very difficult to achieve fast, seamless and lossless handovers at the same time.

Thus, the object of the present invention is to achieve both lossless and continuous transmission at a downlink handover.

The object of the present invention is achieved by the methods and arrangements defined by the independent claims. Preferred embodiments are defined by the dependent claims.

The network node according to the present invention comprising means for determining the last packet to be transmitted form the first radio base station on a first connection and means for informing the UE of the last packet to be transmitted to the UE from said first radio base station on said first connection, makes it possible to achieve both lossless and continuous transmission at a downlink handover.

The first base station according to the present invention comprising means for receiving information of the last packet to be transmitted to the UE from said first radio base station (Node B1) on a first connection, and means for informing the UE of the last packet to be transmitted to the UE from said first radio base station (Node B1) on the first connection, makes it possible to achieve both lossless and continuous transmission at a downlink handover.

Further, the UE according to the present invention comprising means for receiving a notification from the first radio base station (Node B1) that currently serves said UE, said notification indicating the last packet to be transmitted to this user equipment from said first radio base station (Node B1) on a first connection;

and means for informing the second radio base station (Node B2) by a request to commence transmission from this second radio base station (Node B2) when the notified last packet is received at the UE, makes it possible to achieve both lossless and continuous transmission at a downlink handover.

The invention also relates to methods. The method in a network node comprising the steps of determining the last packet to be transmitted from the first radio base station on a first connection, and informing the UE of the last packet to be transmitted to the UE from said first radio base station (Node B1) on said first connection, makes it possible to achieve both lossless and continuous transmission at a downlink handover.

The method in a first radio base station comprising the steps of receiving information of the last packet (flag) to be transmitted to the UE from said first radio base station (Node B1) on a first connection, and informing the UE of the last packet to be transmitted to the UE from said first radio base station (Node B1) on the first connection, makes it possible to achieve both lossless and continuous transmission at a downlink handover.

The method in a UE comprising the steps receiving a notification from the first radio base station (Node B1) that currently serves said UE, said notification indicating the last packet (flag) to be transmitted to this user equipment from said first radio base station (Node B1) on a first connection; and informing the second radio base station (Node B2) by a request to commence transmission from this second radio base station (Node B2) when the notified last packet (flag) is received at the UE, makes it possible to achieve both lossless and continuous transmission at a downlink handover.

Moreover, the present invention is applicable also in cases where the UE is connected to a radio base station with several logical channels ("connections"). Therefore, the network node comprises means for determining a last packet to be transmitted on a second connection form the first radio base station, and means for informing the UE of the last packet to be transmitted to the UE from said first radio base station on the second connection and the UE comprises means for receiving information of the last packet to be transmitted to the UE from said first radio base station on a second connection, and means for informing the UE of the last packet to be transmitted to the UE from said first radio base station on the second connection.

According to embodiments of the invention the determination of the last packet is based on measurement reports received from the UE or on the fill level of the buffer of the first radio base station.

Information of the last packet to be transmitted may be achieved by attaching a notification of the last packet to be transmitted to the last packet to be transmitted or transmitting a notification of the last packet to be transmitted in a control packet or control signal.

According to a further embodiment, an execution time that is associated with the time for handover may be provided by the network. That means that the execution time is transmitted to the UE via the base station and the handover is performed at the execution time if the execution time elapses before the last packet to be transmitted is received at the UE.

The first radio base station according to one embodiment comprises means for prioritizing transmission of packets belonging to UEs that are assigned for handover.

An advantage with the present invention is that it allows for seamlessness and lossless handover. Seamlessness implies that the second radio base station commence transmitting and scheduling as soon as the first radio base station has successfully finished its responsibilities for that UE, and lossless implies that the first radio base station is allowed to continue its transmission until all packets in its buffers are successfully received in the UE.

DESCRIPTION OF THE INVENTION

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

This application concerns any kind of mobile communication network having demands on user-plane buffering in the radio base station and demands on targets of supporting seamless and lossless downlink handovers from one radio base station to another.

The present invention is based on co-ordinating the timing of a downlink cell change with the user-plane data transmission, so that the cell-change is executed directly upon successful reception of the last data available in an "old" radio base station node. Due to this co-ordination it is possible to achieve fast, seamless and lossless handovers.

Figure 1:
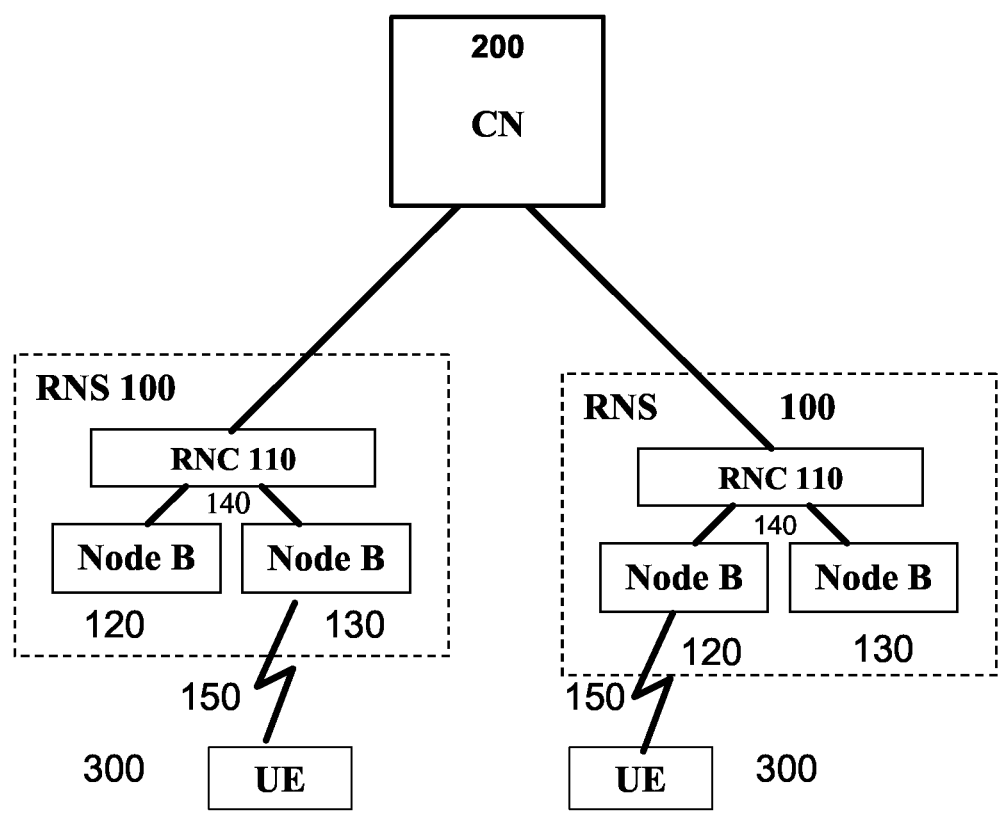
FIG. 1 shows a mobile cellular network wherein the present invention may be implemented.
Figure 2:
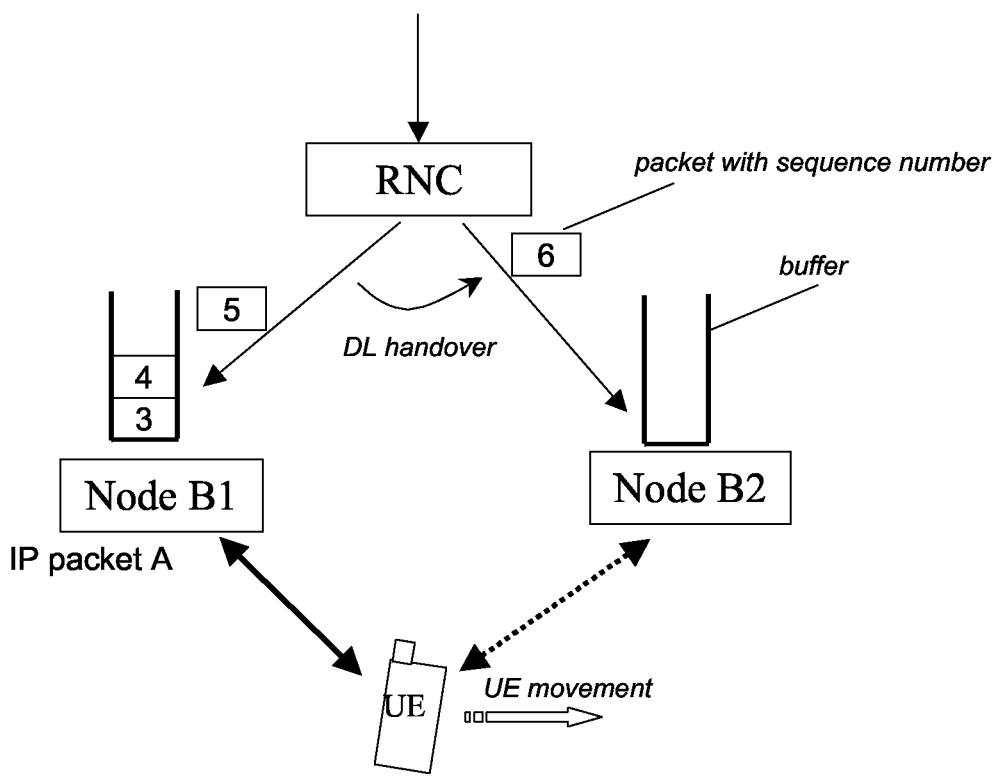
FIG. 2 shows a part of a cellular mobile communication system and illustrates the problem that the present invention intends to solve.
Figure 3:
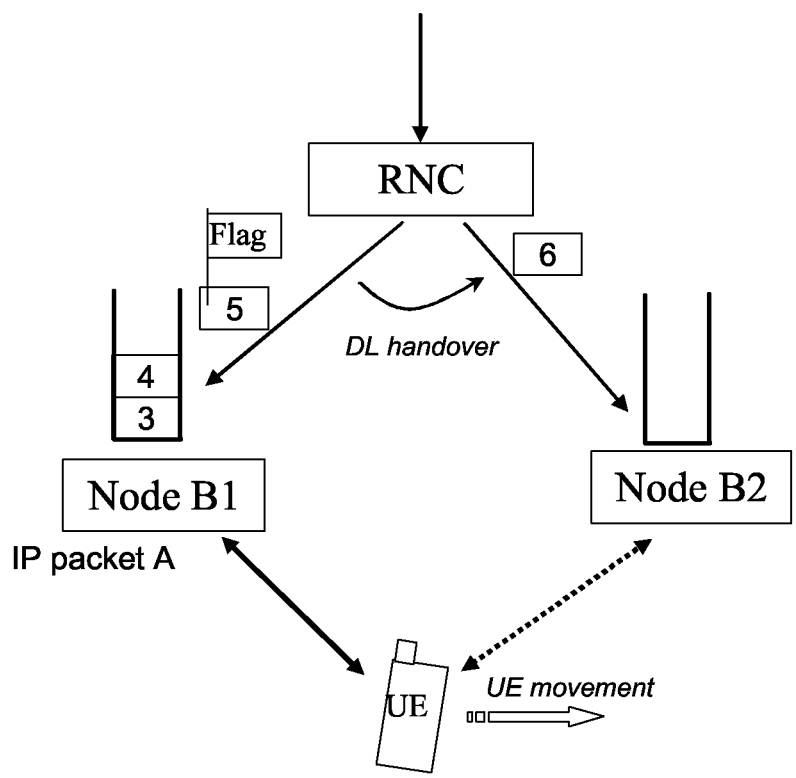
FIG. 3 also shows a part of a cellular mobile communication system and illustrates schematically the solution according to the present invention.

The solution according to the present invention is explained below and in conjunction with FIG. 3. FIG. 3 illustrates the same network as FIG. 2. When assuming that a downlink handover shall take place from a first radio base station, e.g. Node B1, to a second radio base station, e.g. Node B2, an indication of the last packet to be transmitted from the first radio base station is introduced according to the present invention. In a first step, a controlling node, e.g. an RNC, sends an indication, referred to as a flag, of the last packet to be transmitted from the first radio base station, e.g. the Node B1 as illustrated in the FIG. 3. Then, in a second step the controlling node notifies the UE of the last packet to be sent via the first radio base station, Node B1. Upon correct reception of that packet and the aforementioned indication and preferably after having terminated all HARQ processes towards the "old" radio base station, the UE sends in a third step an uplink request, typically on some contention-based channel, to the second radio base station indicating that said second radio base station is now in charge of the UE and should commence transmitting as soon as possible. A contention-based channel implies that collisions may occur, and an example of such a contention-based channel is a random access channel where a transmitter awaits a random time for transmission if a collision has occurred. The above mentioned controlling node is a node adapted to control one or more radio base stations. An example of such a controlling node is a RNC in a WCDMA network.

Hence, the solution relies on means for informing the UE of the flag indicating the last packet to be transmitted from the "old" (i.e. the first) radio base station node. The indication must be based on a sequence number known both in the "old" and the "new", i.e. the second, radio base station node; and means for informing the "new" radio base station node by means of a message from the UE to the "new" radio base station. The message comprises a request to commence transmission from the "new" radio base station node. This message is sent from the UE when the afore-mentioned flag is received meanwhile (i.e. during, before, or after the reception of the flag) the controlling node is performing any necessary configurations to the "new" radio base station node and the UE. The necessary signalling procedures for this are specific for the applied access technology. For WCDMA, examples of such configuration sequences can be found, e.g., in 3GPP TS 25.931.

Further, the present invention concerns means in the controlling node for deciding upon the last packet to be transmitted from the "old" radio base station node, also referred to as the first base station. The decision can be based on information provided by the radio base station nodes, including information on the buffer fill levels and downlink link quality estimates provided by measurement reports transmitted from the UE. An embodiment of the present invention also concerns a scheduler in the radio base station node that prioritizes the transmission of data belonging to UEs that are in progress of performing a handover. In addition, the Node B may comprise means for overriding the decision of the controlling node e.g. when the radio channel conditions are poor such that the packets determined by the controlling node cannot be transmitted.

When the controlling node decides to do a handover, the user-plane anchor point node, also referred to as the controlling node, attaches information of the last packet to be transmitted as a "flag" or similar notification to the last packet to be transmitted from the "old" radio base station node as described above. In a conceivable alternative to this embodiment, e.g. if there are no packets to be transmitted to the UE in question, a specific control packet or control signal without any user-plane payload including the flag indicating the last packet that has been forwarded to the "old" radio base station node, is sent to this "old" radio base station node. This indication can be sent as control-information to the UE using any access specific methods and channels for transmitting control information to the UE. This control signal, and the notification ("flag") could then potentially be sent to the radio base station node prior to the packet it references to.

The controlling node also defines a "handover execution time" which it transmits to the UE via the old base station according to existing art. Thus the execution time is associated with the time for performing the handover, and if the execution time elapses before the indicated last packet is received at the UE or transmitted from the network, the handover is performed at said execution time. This works as an "over-ride" to ensure that the handover is executed also in cases when the "old" radio base station node fails to empty its buffer(s), i.e. it cannot successfully transmit its buffer up to the last packet residing in the buffer. The handover is then executed when a timing offset (derived according to existing art) elapses. According to one embodiment, the "old" radio base station node Node B1 is notified of this execution time, so that the scheduler in the "old" radio base station node Node B1 can optimize its scheduling decisions, e.g. by ensuring that the relevant buffers are emptied on time.

Yet another embodiment of the present invention concerns a radio base station scheduler that prioritizes the scheduling of UEs, which have been assigned for a handover, by prioritizing the remaining packets for these UEs. This embodiment is closely related to the above mentioned embodiment. The benefits of such a scheduler include that the handover is executed faster, and also that the "old" radio base station can disconnect these UEs as soon as possible, which is a benefit as these UEs probably can consume a significant amount of resources due to their low link quality.

According to a further embodiment, the controlling node is assisted in the timing of the handover decision by the involved radio base stations, so that the radio base stations provide information of the present buffer fill-levels and link quality estimates. This information serves as an estimate of the handover execution time and the resource consumption for transmitting the last few packets from the "old" radio base station. In cases when the "old" radio base station has either very large buffer(s) or a low link quality to the UE in question, or both, the controlling node may decide to flag for the handover to be executed based on a packet which is not the last one forwarded to the "old" radio base station. I.e. there are remaining packets in the buffer of the "old" radio base station when the handover is performed. In such case, to achieve lossless handover, the packets that will not be forwarded from the "old" radio base station to the UE has to be re-routed or bi-casted to the "new" radio base station.

Moreover, it should be noted that the present invention is applicable also in cases where the UE is connected to a radio base station with several logical channels ("connections"). In such cases, multiple packets on separate logical channels may be indicated as the last packet to be transmitted, and the activation of the handover is performed based on some logical operation saying, e.g., that the handover is activated when all the referenced packets have been successfully received. Alternatively, the last packet to be transmitted may indicate a packet on a single logical channel, and the handover is executed when this packet has been arrived, irrespectively of the situation on other logical channels.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method in a network node of a cellular mobile communication network for handover of a user equipment, UE, from a first radio base station to a second radio base station, comprising the steps of:
   determining a last packet to be transmitted to the UE from the first radio base station on a first connection,
   determining a last packet to be transmitted to the UE from the first radio base station on a second connection;
   informing the UE of the last packet to be transmitted to the UE from said first radio base station on said first and second connections;
   transmitting an execution time that is associated with a latest time for performing handover, such that handover is performed when the last packet is received at the UE on at least one of said first and second connections if the last packet is received before the execution time elapses, and the handover is performed at the execution time if the execution time elapses before the last packet to be transmitted on at least one of said first and second connections from the first radio base station is received at the UE.

2. The method according to claim 1, wherein the UE is informed via the first radio base station that currently serves said UE.

3. The method according to claim 2, wherein the determination of the last packet is based on the fill level of the buffer of the first radio base station.

4. The method according to claim 1, wherein the determination of the last packet is based on measurement reports received from the UE.

5. The method according to claim 1, wherein the informing step comprises the step of:
   attaching a notification of the last packet to be transmitted to the last packet to be transmitted.

6. The method according to claim 1, wherein the informing step comprises the step of:
   transmitting a notification of the last packet to be transmitted in a control packet or control signal.

7. A method in a first radio base station of a cellular mobile communication network for handover of a user equipment, UE, from the first radio base station to a second radio base station, comprising the steps of:
   receiving information of a last packet to be transmitted to the UE from said first radio base station on a first connection,
   receiving information of a last packet to be transmitted to the UE from said first radio base station on a second connection,
   informing the UE of the last packet to be transmitted to the UE from said first radio base station on the first and second connections;
   receiving an execution time that is associated with a latest time for performing handover, such that handover is performed when the last packet is received on at least one of said first and second connections at the UE if the last packet is received before the execution time elapses, and the handover is performed at the execution time if the execution time elapses before the last packet is received on at least one of said first and second connections at the UE; and
   transmitting said execution time that is associated with the latest time for performing handover to the UE.

8. The method according to claim 7, wherein the information comprises an attached notification to the last packet to be transmitted.

9. The method according to claim 7, wherein the information is transmitted by means of a control packet or a control signal.

10. The method according to claim 7, wherein it comprises the further step of:
    scheduling packets to be transmitted in order to empty the buffer of the first radio base station within the received execution time.

11. The method according to the previous claim 10, wherein it comprises the further step of:
    prioritizing transmission of packets belonging to UEs that are assigned for handover.

12. A method in a user equipment, UE, of a cellular mobile communication system for a handover from a first radio base station to a second radio base station, comprising the steps:
    receiving a notification from the first radio base station that currently serves said UE, said notification indicating a last packet to be transmitted to this user equipment from said first radio base station on a first connection;
    receiving a notification from the first radio base station that currently serves said UE, said notification indicating a last packet to be transmitted to the user equipment from said first radio base station on a second connection;
    receiving an execution time that is associated with the latest time for performing handover;
    performing handover at the execution time if the execution time elapses before the last packet is received on at least one of said first and second connections;
    performing handover when the last packet is received if the last packet is received on at least one of said first and second connections before the execution time elapses, and
    informing the second radio base station of execution of handover by a request to commence transmission from this second radio base station when the last packet on at least one of said first and second connections is received.

13. The method according to claim 12, wherein it comprises the further step of:
    terminating the HARQ-processes towards the first radio base station and collecting re-configuration data.

14. A network node of a cellular mobile communication network adapted to control handover of a user equipment, UE, from a first radio base station to a second radio base station, comprising:
    means for determining a last packet to be transmitted to the UE from the first radio base station on a first connection;
    means for determining a last packet to be transmitted to the UE from the first radio base station on a second connection;
    means for informing the UE of the last packet to be transmitted to the UE from said first radio base station on said first and second connections;
    means for transmitting an execution time that is associated with a latest time for performing handover, such that the handover is performed when the last packet is received at the UE on at least one of said first and second connections if the last packet to be transmitted from the first radio base station is received before the execution time elapses, and handover is performed at the execution time if the execution time elapses before the last packet to be transmitted on at least one of said first and second connections from the first base station is received at the UE.

15. The network node according to claim 14, wherein the UE is informed via the first radio base station that currently serves said UE.

16. The network node according to claim 15 wherein the determination of the last packet is based on the fill level of the buffer of the first radio base station.

17. The network node according to claim 14, wherein the determination of the last packet is based on measurement reports received from the UE.

18. The network node according to claim 14, wherein the means for informing comprises means for attaching a notification of the last packet to be transmitted to the last packet to be transmitted.

19. The network node according to claim 14, wherein the means for informing comprises means for transmitting a notification of the last packet to be transmitted in a control packet or control signal.

20. A first radio base station of a cellular mobile communication network adapted for handling handover of a user equipment, UE, from the first radio base station to a second radio base station, comprising:
    means for receiving information of a last packet to be transmitted to the UE from said first radio base station on a first connection,
    means for receiving information of a last packet to be transmitted to the UE from said first radio base station on a second connection:
    means for informing the UE of the last packet to be transmitted to the UE from said first radio base station on the first and second connections;
    means for receiving an execution time that is associated with a latest time for performing handover, such that the handover is performed when the last packet is received at the UE on at least one of said first and second connections if the last packet is received before the execution time elapses, and handover is performed at the execution time if the execution time elapses before the last packet to be transmitted on at least one of said first and second connections from the first base station is received at the UE; and
    means for transmitting said execution time that is associated with the latest for performing handover to the UE.

21. The first radio base station according to claim 20, wherein the information comprises an attached notification of the last packet to be transmitted.

22. The first radio base station according to claim 20, wherein the information is transmitted by means of a control packet or a control signal.

23. The first radio base station according to claim 20, wherein it comprises the further means for scheduling packets to be transmitted in order to empty the buffer of the first radio base station within the received execution time.

24. The first radio base station according to the previous claim 23, wherein it comprises the further means for prioritizing transmission of packets belonging to UEs that are assigned for handover.

25. A user equipment, UE, of a cellular mobile communication system adapted to perform handover from a first radio base station to a second radio base station, comprising:
    means for receiving a notification from the first radio base station that currently serves said UE, said notification indicating a last packet to be transmitted to this user equipment from said first radio base station on a first connection;
    means for receiving a notification from the first radio base station that currently serves said UE, said notification indicating a last packet to be transmitted to the user equipment from said first radio base station on a second connection;
    means for receiving an execution time that is associated with a latest time for performing handover, wherein the UE is adapted to perform handover at the execution time if the execution time elapses before the last packet is received on at least one of said first and second connections, and the UE is adapted to perform handover when the last packet is received if the last packet is received on at least one of said first and second connections before the execution time elapses; and
    means for informing the second radio base station of execution of handover by a request to commence transmission from the second radio base station when the last packet on at least one of said first and second connections is received.

26. The UE according to claim 25, wherein it further comprises means for terminating the HARQ-processes towards the first radio base station and collecting re-configuration data.

* * * * *

UNITED STATES PATENT AND TRADEMARK OFFICE
CERTIFICATE OF CORRECTION

PATENT NO. : 8,488,552 B2  
APPLICATION NO. : 12/090633  
DATED : July 16, 2013  
INVENTOR(S) : Torsner et al.

Page 1 of 1

It is certified that error appears in the above-identified patent and that said Letters Patent is hereby corrected as shown below:

On the Title Page, in Item [75] under "Inventors", in Column 1, Line 3,
delete "Londondony" and insert -- Londonderry --, therefor.

In the Specification
In Column 3, Line 7, delete "form" and insert -- from --, therefor.

In the Claims
In Column 7, Line 50, in Claim 7, delete "connection," and insert -- connection; --, therefor.
In Column 9, Line 40, in Claim 20, delete "latest for" and insert -- latest time for --, therefor.

Signed and Sealed this
Twelfth Day of November, 2013

Teresa Stanek Rea
*Deputy Director of the United States Patent and Trademark Office*